(12) United States Patent
Martchovsky

(10) Patent No.: US 8,510,492 B2
(45) Date of Patent: Aug. 13, 2013

(54) SYSTEM AND METHOD FOR COMMUNICATION HANDSHAKING BETWEEN A MASTER PROCESSORS AND A SLAVE PROCESSOR

(75) Inventor: Detelin Martchovsky, Fremont, CA (US)

(73) Assignee: Integrated Device Technology inc., San Jose, CA (US)

( * ) Notice: Subject to any disclaimer, the term of this patent is extended or adjusted under 35 U.S.C. 154(b) by 316 days.

(21) Appl. No.: 12/877,259

(22) Filed: Sep. 8, 2010

(65) Prior Publication Data

US 2012/0059489 A1      Mar. 8, 2012

(51) Int. Cl.
*G06F 13/24*     (2006.01)
*G06F 9/48*      (2006.01)
(52) U.S. Cl.
CPC .................................. *G06F 9/4812* (2013.01)
USPC .......................................... 710/267; 710/260

(58) Field of Classification Search
USPC .................. 710/104–110, 260–269, 306–317
See application file for complete search history.

(56) References Cited

U.S. PATENT DOCUMENTS

| | | | | |
|---|---|---|---|---|
| 4,551,718 A * | 11/1985 | Cookson et al. | ............... | 340/517 |
| 6,154,763 A * | 11/2000 | Thijssen | ....................... | 718/102 |
| 6,901,503 B2 * | 5/2005 | Barlow et al. | ................. | 712/210 |
| 7,047,340 B1 * | 5/2006 | Baumgartner et al. | ........ | 710/305 |
| 2006/0143348 A1 * | 6/2006 | Wilson et al. | .................. | 710/110 |
| 2009/0043916 A1 * | 2/2009 | Schramm et al. | ............... | 710/11 |
| 2009/0248932 A1 * | 10/2009 | Taylor et al. | ................... | 710/110 |

\* cited by examiner

*Primary Examiner* — Raymond Phan
(74) *Attorney, Agent, or Firm* — Haynes and Boone LLP

(57) ABSTRACT

System and method for handshaking between first and second processors via a single wire connecting a first pin of the first processor and a second pin of the second processor are described. In one embodiment, the method comprises the first processor disabling an interrupt function on the first pin; and, subsequent to the disabling, interrupting the second processor by driving the first pin to a first logic level and then releasing the first pin to a second logic level.

18 Claims, 3 Drawing Sheets

SYSTEM AND METHOD FOR COMMUNICATION HANDSHAKING BETWEEN A MASTER PROCESSORS AND A SLAVE PROCESSOR

BACKGROUND

1. Technical Field

Some embodiments of the present invention relate to interprocessor communication and, more specifically, to interprocessor communication using a handshake wrap around a communication interface between the processors.

2. Description of the Related Arts

Communication between two processors always presents the challenge of determining which processor will serve as the "master" and which will serve as the "slave." Each processor executes its own set of instructions and may be in a busy or low power state while the other processor is attempting to communicate with it. Often, processors are embedded in a package and have a limited number of pins allotted thereto. Software handshaking presents special challenges to the communication hardware, e.g., buffers, and also results in increased power consumption due to the need for continuous readiness.

One solution has been to use two signals for handshaking between processors, such as is the case with RTS/CTS in RS232 protocol. This approach requires the use of two, instead of just one, general purpose input/output ("GPIO") pins per processor. The use of two GPIO pins is clearly undesirable in view of the fact that, as discussed above, a limited number of pins are allotted to each processor. Another solution has been to use a single handshaking line that works from slave to master only. The handshaking from master to slave is implemented as query packets, the undesirable result of which is an increase in protocol overhead and power consumption in the slave interface due to the requirement that the slave processor remain in a constant state of readiness.

Therefore, what is needed is a mechanism for implementing handshaking between processors that is implemented via a single line and that does not require one of the processors to remain in a constant state of readiness.

SUMMARY

One embodiment is a method for handshaking between first and second processors via a single wire connecting a first pin of the first processor and a second pin of the second processor. The method comprises the first processor disabling an interrupt function on the first pin; and, subsequent to the disabling, interrupting the second processor by driving the first pin to a first logic level and then releasing the first pin to a second logic level.

Another embodiment is a method for enabling handshaking between first and second processors via a single wire connecting a first pin of the first processor and a second pin of the second processor. The method comprises the first processor preparing a message to be sent to the second processor; enabling a slave communication interface of the first processor; disabling an interrupt function on the first pin; and driving the first pin to a first logic level to interrupt the second processor.

Yet another embodiment is a communications system for enabling handshaking between processors via a single wire. The communications system comprises a first processor having a first input/output pin; a second processor having a second input/output pin connected to the first input/output pin of the first processor and a communications interface between the first and second processors, wherein all handshaking functions occur only via the first and second pins.

These and other embodiments are further described below with reference to the following figures.

BRIEF DESCRIPTION OF THE DRAWINGS

The teachings of the embodiments described herein can be readily understood by considering the following detailed description in conjunction with the accompanying drawings.

DETAILED DESCRIPTION OF EMBODIMENTS

The Figures and the following description relate to some embodiments by way of illustration only. It should be noted that from the following discussion, alternative embodiments of the structures and methods disclosed herein will be readily recognized as viable alternatives that may be employed without departing from the principles of the embodiments described herein.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles of the embodiments described herein.

According to some embodiments, one signal wire provides a handshake wrap around SPI, I2C, or another appropriate interface for enabling communication between two processors. The same wire is used for the wake up signal, readiness negotiation, and end of transaction signaling.

Figure 1:
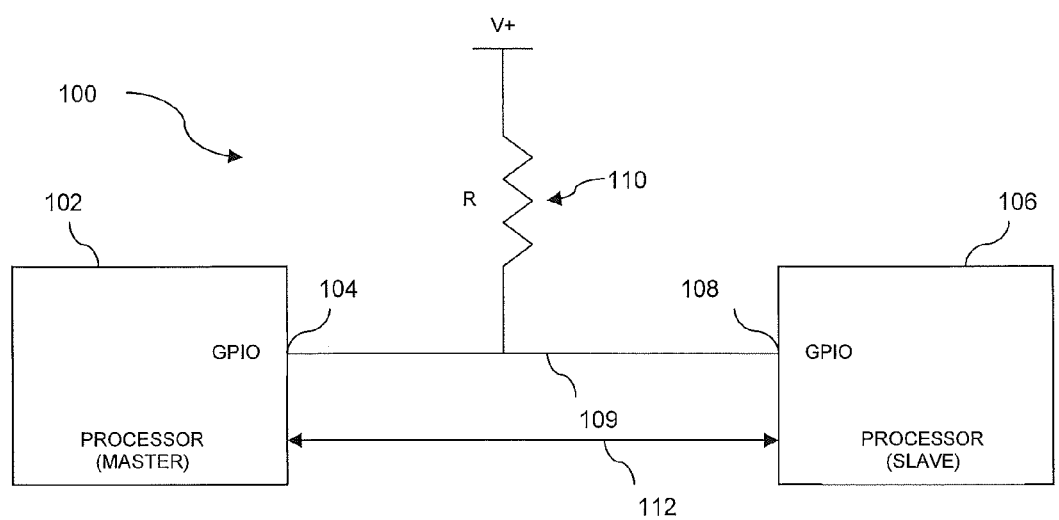
FIG. 1 is a block diagram of a system for implementing communication handshaking between a master processor and a slave processor in accordance with some embodiments.

FIG. 1 is a block diagram of a system 100 for implementing communication handshaking between a master processor and a slave processor in accordance with some embodiments. As shown in FIG. 1, the system comprises a first processor 102 having a general purpose input/output ("GPIO") pin 104 and a second processor 106 comprising a GPIO pin 108. The first and second processors 102, 106, are coupled to one another via their respective GPIO pins 104, 108, as indicated by a line 109. In some embodiments, an external pull-up resistor 110 can also be provided; however, it will be recognized that the resistor 110 may be replaced by a pull-up functionality of one of the GPIOs 104, 108. It will be recognized that a pull-down resistor arrangement may also be used to implement the system; however, such an arrangement would be less practical for reasons understandable to one of ordinary skill in the art. Therefore, only the pull-up resistor arrangement will be described in detail herein.

In accordance with features of some embodiments, both GPIOs 104, 108, are in Open Drain configuration and have interrupt capability. A communication interface 112 between the processors 102, 106, may be implemented using SPI, I2C, or any other appropriate serial or parallel communication interface. For ease of explanation, it will be assumed that the interface hardware in the processor 102 is configured in master mode and the interface hardware in the processor 106 is configured in slave mode.

Figure 2:
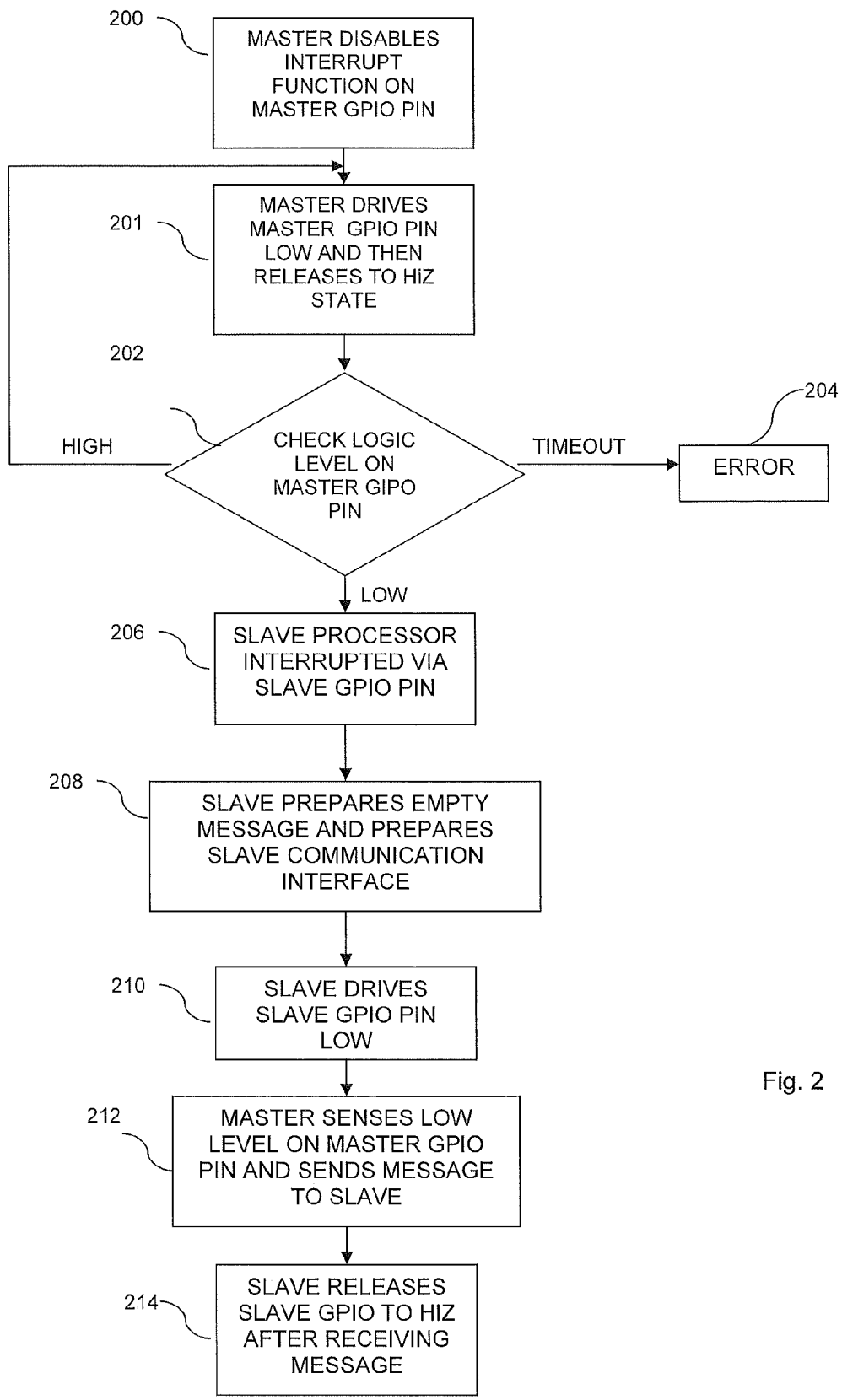
FIG. 2 is a flowchart of a method for notifying the slave processor of FIG. 1 that the master processor thereof has a message pending to be sent to the slave processor.
Figure 3:
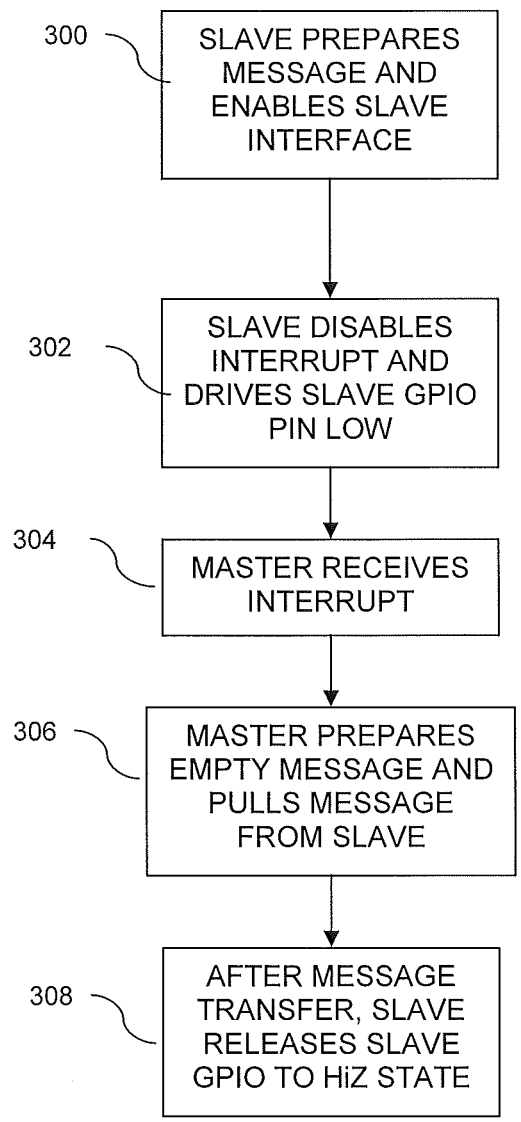
FIG. 3 is a flowchart of a method for notifying the master processor of FIG. 1 that the slave processor thereof has a message pending to be sent to the master processor.

Referring now to FIGS. 2 and 3, operation of the system 100 in accordance with one embodiment will be described. In particular, FIG. 2 illustrates operation of the system in a situation in which a message is pending to be sent from the master processor (processor 102) to the slave processor (processor 106). In step 200, the master processor (processor 102) disables the interrupt function on its GPIO pin (GPIO pin 104). In step 201, the master processor (processor 102) drives its GPIO pin low for a short period of time before releasing it to a HiZ state, at which point the master processor (processor 102) checks the logic level of its GPIO pin, in step 202. If the logic level of the master processor's GPIO pin (GPIO pin 104) is high, execution returns to step 201 and the process is repeated until a low logic level is detected at step 202 or a timeout occurs. If a timeout occurs before a low logic level is detected at step 202, an error occurs in step 204.

Once a low logic level is detected at step 202, execution proceeds to step 206, in which a resultant low logic level at the GPIO pin of the slave processor (GPIO pin 108), interrupts the slave processor (processor 106), eventually taking it out of sleep mode. In step 208, the slave processor (processor 106) prepares an empty message and enables its slave communication interface, depending on the communications protocol implemented in the system. In step 210, the slave processor (processor 106) drives its GPIO pin (GPIO pin 108) low, indicating it is ready and waiting in receive mode. In step 212, the master processor (processor 102) senses the low level on its GPIO pin (GPIO pin 104) and sends the message via an appropriate communication interface between the processors. In step 214, after the message is received by the slave, the slave processor (processor 106) releases its GPIO pin (GPIO pin 108) back to HiZ state, indicating the end of the transaction.

FIG. 3 illustrates operation of the system in a situation in which a message is pending to be sent from the slave processor (processor 106) to the master processor (processor 102). In step 300, the slave processor (processor 106) prepares the message and enables its slave interface. In step 302, the slave processor (processor 106) disables its interrupt and drives its GPIO pin (GPIO pin 108) low. In step 304, the master processor (processor 102) receives an interrupt on its GPIO pin (GPIO pin 104). In step 306, the master processor (processor 102) prepares an empty message, depending on the communications protocol implemented in the system, and pulls the pending message from the slave processor (processor 106) via the communications interface between the processors. In step 308, after the transfer, the slave processor (processor 106) releases its GPIO pin (GPIO pin 108) to HiZ state.

In accordance with some embodiments, the handshaking protocol provides a timeout scheme to recover from an erroneous state. For example, if the slave processor drives its GPIO pin low and does not "see" a transaction within a predetermined time period, indicating that the interrupt was not recognized by the master processor, it releases its GPIO pin to HiZ state for a predetermined time period and then drives it low again. Similarly, if the master processor completes the transfer and does not detect a high level on its GPIO pin within a predetermined time period, indicating that the message was not completely received by the slave processor (e.g., due to noise on the clock line), it sends an empty message to flush the slave processor.

Upon reading this disclosure, those of skill in the art will appreciate still additional alternative designs or implementation details for the embodiments described herein. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus of the embodiments disclosed herein without departing from the spirit and scope thereof.

What is claimed is:

1. A method for handshaking between first and second processors via a single wire connecting a first pin of the first processor and a second pin of the second processor, the method comprising:
    disabling, by the first processor, an interrupt function on the first pin; and
    driving, by the first processor, the first pin to a first logic level to interrupt the second processor;
    releasing, by the first processor, the first pin to a second logic level; and
    sending, by the first processor, a message to the second processor in response to sensing that the first pin has been driven to the first logic level, the first pin having been driven to the first logic level by the second processor in response to interrupting the second processor.

2. The method of claim 1 further comprising, subsequent to the driving and releasing, checking the logic level of the first pin, wherein if the checked logic level of the first pin is high, repeating the driving and releasing until the checked logic level of the first pin is low.

3. The method of claim 1 further comprising:
    preparing an empty message, and preparing a slave communication interface of the second processor in response to interrupting the second processor.

4. The method of claim 1 further comprising, responsive to receipt by the second processor of the message, the second processor releasing the second pin to the second logic level.

5. The method of claim 1 wherein the first logic level is a low logic state and the second state is a HiZ state.

6. The method of claim 1 wherein the first and second pins are general purpose input/output ("GPIO") pins configured in open configuration and having interrupt capability.

7. The method of claim 1 wherein the first processor is configured to operate as a master and the second processor is configured to operate as a slave.

8. A method for enabling handshaking between first and second processors via a single wire connecting a first pin of the first processor and a second pin of the second processor, the method comprising:
    preparing, by the first processor, a message to be sent to the second processor;
    enabling, by the first processor, a slave communication interface of the first processor;
    disabling, by the first processor, an interrupt function on the first pin;
    driving, by the first processor, the first pin to a first logic level to interrupt the second processor; and
    transmitting the message to the second processor, the message being transmitted to the second processor by the second processor pulling the message in response to interrupting the second processor.

9. The method of claim 8 further comprising:
    preparing, by the second processors, an empty message in response to interrupting the second processor.

10. The method of claim 8 further comprising, subsequent to the pulling, the first processor releasing the first pin to a second logic level.

11. The method of claim 8 wherein the first and second pins are each general purpose input/output ("GPIO") pins.

12. The method of claim 8 wherein the first logic level is a low logic state and the second logic level is a HiZ state.

13. The method of claim 8 wherein each of the pins is in open configuration and has interrupt capability.

14. The method of claim 8 wherein the first processor is configured to operate as a slave and the second processor is configured to operate as a master.

15. A communications system for enabling handshaking between processors via a single wire, the communications system comprising:
   a first processor having a first input/output pin;
   a second processor having a second input/output pin connected to the first input/output pin of the first processor;
   a communications interface between the first and second processors;
   wherein a message is transmitted between the first processor and the second processor by interrupting the first or second processor by driving a first or second input/output pin to a first state, transmitting the message, and then releasing the first or second input/output pin to a second state.

16. The system of claim 15 wherein the first processor is configured to operate as a master and the second processor is configured to operate as a slave and wherein each of the first and second pins comprises a general purpose input/output ("GPIO") pin configured in open drain configuration and having interrupt capabilities.

17. The system of claim 15 wherein, to transmit the message from the master to the slave:
   the master interrupts the slave by pulsing the first pin to the first state and then releasing it to the second state, the first state being a low state and the second state being a high state;
   the slave prepares an empty message and subsequently drives the second pin to the first state;
   responsive to sensing the first state on the second pin, the master sends the message to the slave; and
   responsive to receipt of the message by the slave, the slave releases the second pin to the second state.

18. The system of claim 15 wherein, to send a transmit the message from the slave to the master:
   the slave prepares the message and enables its slave interface;
   the slave disables interrupts on the second pin and drives the second pin to the first state to interrupt the master;
   responsive to the interrupt, the master prepares an empty message and pulls the message from the slave; and
   subsequent to transfer of the message, the slave releases the second pin to the second state, wherein the first state is a low state, and the second state is a high state.

* * * * *